US010503906B2

(12) United States Patent
Seigel et al.

(10) Patent No.: US 10,503,906 B2
(45) Date of Patent: Dec. 10, 2019

(54) DETERMINING A RISK INDICATOR BASED ON CLASSIFYING DOCUMENTS USING A CLASSIFIER

(71) Applicant: QUEST SOFTWARE INC., Aliso Viejo (CA)

(72) Inventors: Jake Seigel, Halifax (CA); Robert MacIntosh, Halifax (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 193 days.

(21) Appl. No.: 14/956,464

(22) Filed: Dec. 2, 2015

(65) Prior Publication Data
US 2017/0161503 A1  Jun. 8, 2017

(51) Int. Cl.
G06F 21/57 (2013.01)
H04L 29/06 (2006.01)
G06F 21/55 (2013.01)

(52) U.S. Cl.
CPC .......... G06F 21/577 (2013.01); G06F 21/552 (2013.01); G06F 21/554 (2013.01); H04L 63/1425 (2013.01); G06F 2221/2113 (2013.01); H04L 63/1416 (2013.01)

(58) Field of Classification Search
CPC .... G06F 21/577; G06F 21/554; G06F 21/552; G06F 2221/2113; H04L 63/1425; H04L 63/1416
See application file for complete search history.

(56) References Cited

U.S. PATENT DOCUMENTS

| 8,839,435 | B1* | 9/2014 | King | H04L 63/1425 |
| | | | | 726/22 |
| 9,361,377 | B1* | 6/2016 | Azari | G06F 16/951 |
| 2004/0267893 | A1* | 12/2004 | Lin | H04L 51/12 |
| | | | | 709/207 |
| 2006/0117388 | A1* | 6/2006 | Nelson | G06F 11/008 |
| | | | | 726/25 |
| 2007/0150954 | A1* | 6/2007 | Shon | H04L 63/1416 |
| | | | | 726/23 |
| 2012/0101919 | A1* | 4/2012 | Waks | G06Q 40/12 |
| | | | | 705/30 |
| 2012/0210388 | A1* | 8/2012 | Kolishchak | G06F 21/552 |
| | | | | 726/1 |
| 2012/0216243 | A1* | 8/2012 | Gill | G06F 21/55 |
| | | | | 726/1 |

(Continued)

Primary Examiner — Cheng-Feng Huang
(74) Attorney, Agent, or Firm — Maschoff Brennan

(57) ABSTRACT

Systems and techniques for determining and displaying risk indicators are described. A set of event logs occurring in a time interval and associated with a user account retrieving may be retrieved from an event log database. For individual event logs in the set of event logs, a context may be determined. A resource associated with the individual log may have an associated classification. An activity risk associated with the individual event log may be determined based at least in part on the first context and, if applicable, on the associated classification. For individual event logs in the set of event logs, a risk indicator may be determined based at least in part on the activity risk. In some cases, a cumulative risk indicator may be determined for the particular time interval based on the risk indicators associated with the individual event logs.

20 Claims, 8 Drawing Sheets

(56) References Cited

U.S. PATENT DOCUMENTS

| | | | |
|---|---|---|---|
| 2013/0152158 A1* | 6/2013 | Yoshihama | G06F 21/60 |
| | | | 726/1 |
| 2015/0026027 A1* | 1/2015 | Priess | G06Q 40/00 |
| | | | 705/35 |
| 2015/0026810 A1* | 1/2015 | Friedrichs | G06F 21/564 |
| | | | 726/23 |
| 2016/0006749 A1* | 1/2016 | Cohen | G06F 16/285 |
| | | | 726/23 |
| 2016/0306965 A1* | 10/2016 | Iyer | G06F 21/552 |

* cited by examiner

DETERMINING A RISK INDICATOR BASED ON CLASSIFYING DOCUMENTS USING A CLASSIFIER

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a large computer system, maintaining information security is a difficult task as, in many cases, a security system may have difficulties distinguishing legitimate activities from the unauthorized access of data. Currently, a risk associated with a user account may be determined by looking at the resources to which the user account has access, groups to which the user account belongs, and resources which the user account owns. However, highly privileged user accounts, e.g., user account with full access privileges to many resources in a computing system, have high privilege levels to enable the user accounts to perform legitimate actions. Thus, a determination of risk based on the resources to which a user account has access, groups to which the user account belongs, and resources which the user account owns may not accurately identify the risk associated with the user account.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques for determining and displaying risk indicators are described. A set of event logs occurring in a time interval and associated with a user account retrieving may be retrieved from an event log database. For individual event logs in the set of event logs, a context may be determined. A resource associated with the individual log may have an associated classification. An activity risk associated with the individual event log may be determined based at least in part on the first context and, if applicable, on the associated classification. For individual event logs in the set of event logs, a risk indicator may be determined based at least in part on the activity risk. In some cases, a cumulative risk indicator may be determined for the particular time interval based on the risk indicators associated with the individual event logs.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
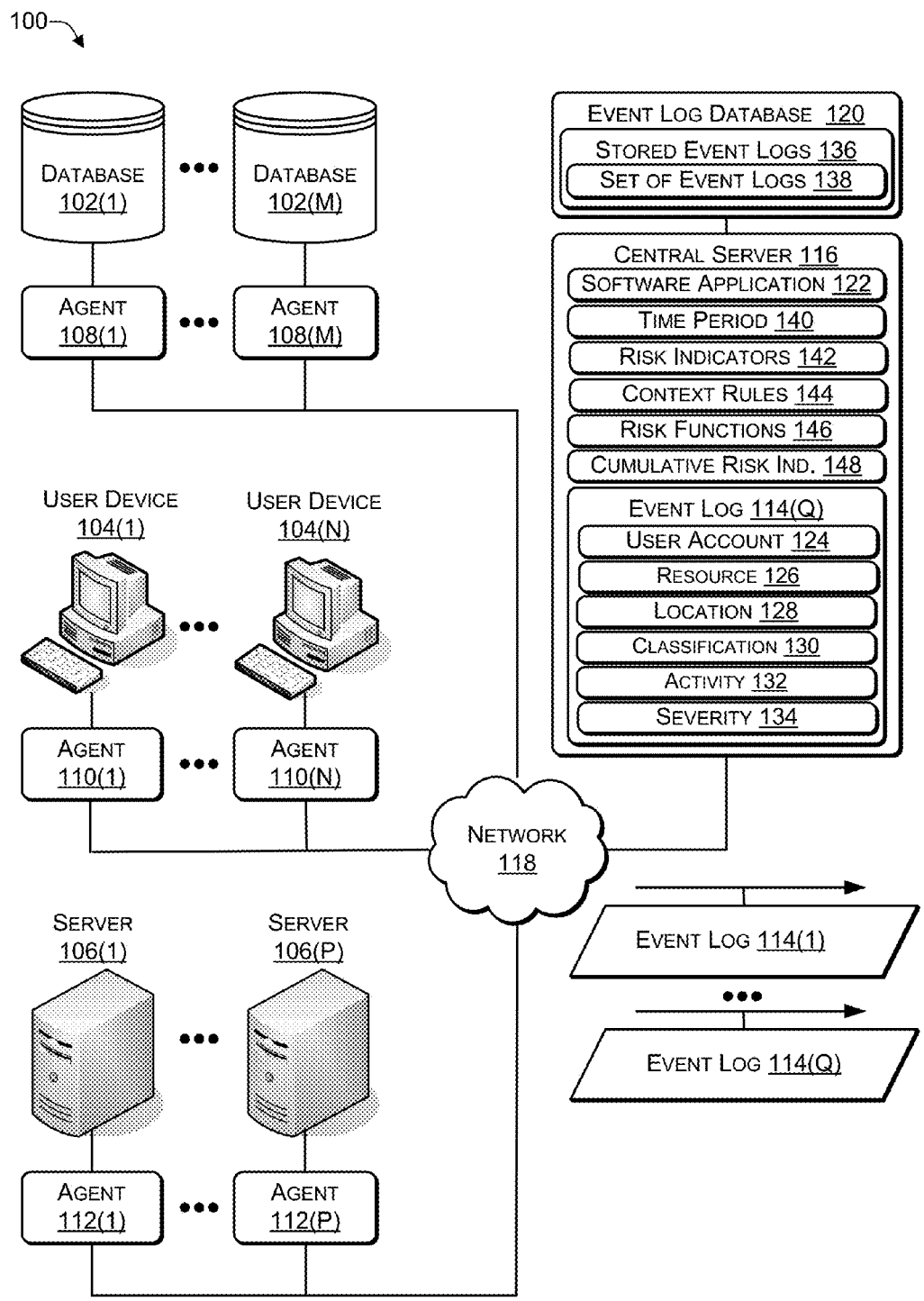
FIG. 1 is a block diagram illustrating a computing system that includes a central server to monitor event logs according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The system and techniques described herein enable high risk user accounts to be distinguished from user accounts with high level access privileges based on analyzing and tracking the activities that are being performed by the user accounts. By doing so, risk is determined not based on the resources that a user account is capable of accessing but instead the risk is determined based on the resources that the user account is actually accessing.

In a computing system, agents (e.g., software applications) may be deployed to monitor activities associated with resources and to generate event logs based on the activities. The resources in the computing system may include databases, user computing devices (e.g., workstations), servers, directories, folders, documents, and the like. Individual agents may monitor one or more resources and generate an event log each time particular types of events occur. In some cases, the agent may assign a severity to the event log based on the type of event. For example, when data is read from a database, the agent may generate a read event log that has a relatively low severity. When data is written to the database, the agent may generate a write event log that has a relatively high severity as compared to the read event log.

A risk management application may use a sliding time window, e.g., a period of time where the starting point and ending point are adjustable, to select a set of event logs for analysis and determine a risk indicator associated with each activity as well as a cumulative risk indicator associated with the sliding time window, based on the event logs that were generated within the sliding time window. The cumulative risk indicator may include an average of the risk indicators associated with the event logs in the sliding time window, a median of the risk indicators associated with the event logs, a sum of the risk indicators associated with the event logs, a highest risk indicator of the risk indicators associated with the event logs, or any combination thereof. For example, the risk management application may select a time window of N hours (e.g., N>0, such as N=24 hours) and determine a risk indicator for each activity in the time window based on the event logs that occurred within the particular time period of N hours. Thus, multiple risk indicators may be determined for the multiple event logs in the time window. The multiple risk indicators (e.g., with each risk indicator corresponding to an event log in the time window) may be mapped over a period of time to determine whether the user account is engaging in increasingly risky activities, to identify when the user account engaged in high risk activities, when the user account engaged in the highest risk activity, etc.

In some cases, a cumulative risk indicator associated with the time window may be determined, e.g., based on the risk indicators determined for each event log occurring within the time window. After determining the cumulative risk indicator for the time window, the starting point and ending point of the time window may be adjusted, another cumulative risk indicator determined, and the process repeated to create multiple cumulative risk indicators corresponding to multiple time windows. The multiple cumulative risk indicators may be mapped over a period of time (e.g., N days, where N>0) to determine whether the risk indicators are increasing or decreasing, to identify time periods during which the user account engaged in high risk activities, etc.

Individual resources in a computing system may be scanned and associated with a classification based on a taxonomy. For example, a machine learning algorithm, such as a classifier, may scan documents in a computing system and classify them based on a taxonomy. An example of a four category taxonomy to classify documents (e.g., based on their contents) may include the classifications public, internal, confidential, or restricted. Documents classified as public may include documents that may be shared with people inside as well as outside of an enterprise (e.g., a company). Documents classified as internal may include documents that may be shared with people inside the enterprise but may not be shared outside the enterprise. Documents classified as confidential may include documents that might harm the enterprise if they were available to unauthorized parties. Documents classified as restricted may include documents that are subject to legal or contractual obligations. In a simplified taxonomy, documents that are classified as public or internal may be referred to as low-level documents while documents that are classified as confidential or restricted may be referred to as high-level documents. The systems and techniques described herein may determine the classification of resources as one of several factors when determining a risk indicator. For example, a user account accessing high-level documents multiple times within a time period may be determined to be likely engaging in high risk activities.

Structured data refers to information that is organized to a large extent (e.g., based on the relationships within the data), such as information stored in a relational database or similar data table. Unstructured data refers to information that is not organized, such as, for example, e-mail messages, word processing documents, videos, photos, audio files, presentations, webpages, and other types of documents. Semi-structured data refers to data that does not have a formal structure (e.g., semi-structured data does not have a data model associated with a data table, such as a relational database), but does include tags or other markers to separate semantic elements and enforce hierarchies of records and fields within the data.

A classifier (or other machine learning algorithm) may be used to scan the contents of a document that includes unstructured data or semi-structured data and associate a classification with the document based on the contents of the document. For example, the classifier may examine a document that includes information associated with an office football pool and classify the document as public information or internal information. As another example, the classifier may examine a document that includes information expense reports having credit card information and classify the document as confidential information or restricted information. A classifier may crawl through unstructured documents stored in an enterprise's document storage facility (e.g., SharePoint®), examine the contents of individual documents, and associate a classification with the individual documents based on examining the contents.

By looking at user accounts that are using the access privileges associated with the user accounts, determining risk shifts from what the user accounts are capable of doing to what the user accounts are actually doing, e.g., what classification of resources are being accessed, how often the resources are being accessed, the type of access that is being used, etc. By shifting the focus in this way, high risk user accounts may be identified based on the user accounts that are actively accessing resources (including resources classified as high-level) in the computer system, rather than user accounts with merely the potential to access the resources. For example, a user account may have administrative privileges to enable a system administrator to provision resources in a computing system. Such a user account may not have a legitimate reason to read the contents of high level (e.g., restricted or confidential) documents. Thus, determining that a user account with administrative privileges is reading the contents of high level documents may result in the activities performed by the user account to be identified as high risk activities. Thus, determining risk by taking into consideration event logs that indicate access to high level documents may provide a more accurate measure of user risk. For example, a user account that is determined to be accessing resources that have been classified (e.g., using a taxonomy) with a high level (e.g., restricted or confidential) during a time window may cause the user account's risk indicator to increase during the time window.

A risk indicator may be permanently or temporarily associated with each user account. In some cases, an identity manager (e.g., Dell® Identity Manager) may use the risk indicator associated with a user account to generate an alert, create a policy, etc. For example, if the identity manager determines that the risk indicator associated with a user account satisfies a threshold, the identity manager may generate an alert, notifying a system administrator or a security professional that the risk indicator associated with the user account indicates that the user account is performing high risk activities. Identity management products can then utilize these risk changes for alerts, policies (e.g., a prerequisite set of conditions associated with one or more actions), etc.

A representational state transfer (REST) service interface (or similar interface) may be used for communications between an event log system (e.g., Dell® Change Auditor) and an identity manager system (e.g., Dell® Identity Manager). The analysis of event logs and the classifications associated with the resources being accessed (e.g., as indicated by the event logs) may be performed by event log system, the identity manager system, or a combination of both.

In some cases, a risk value may be associated with particular types of event logs, such that a user account that generates the particular types of event logs may result in an increase in the risk indicator associated with the user account. The event logs may be generated when accessing any level of resource in an enterprise's computing system, e.g., including resources classified as low level (e.g., public or internal) and resources classified as high level (e.g., confidential or restricted). In some cases, the risk indicator associated with a user account may be determined based on various factors, including risk values associated with particular types of event logs and the classification associated with the resources being accessed. For example, a classifier (e.g., a machine learning algorithm or other similar technique) may be used to determine what risk value to associate with particular event logs.

In some cases, the risk indicator may be determined based on analyzing event logs generated (e.g., that have an associated timestamp) within a sliding time window (e.g., a particular period of time, such as M hours where M>0). The start time and the end time of the window may be repeatedly adjusted to determine multiple risk indicators that are plotted to determine trends, identify time periods during which the user account is engaging in high risk activities, etc. For example, a time window of one hour may be used to determine a risk indicator for a particular user account for each hour and a graph created using the risk indicators for N days (where N>1). To illustrate, a risk indicator may be determined for each hour over the course of a week and the results graphed. If the value of the risk indicator increases over time, the software application may determine that the user account is engaging in higher risk activities as time goes on. If on one or more hours during the week the value of the risk indicator exceeds an average value of the risk indicator during the week, the software application may determine that the user account may have engaged in high risk activities during the one or more hours. For example, the average value of the risk indicator during the week may be X and, on three hours in the week, the value of the risk indicator exceeded 120% of X, indicating that on the three hours, the user account may have engaged in high risk activities. In some cases, a weighting scheme may be used to weight risk based on how various factors, such as how frequently a resource is accessed, a classification of the resources being accessed, a time of day when resources are being accessed (e.g., accesses during normal business hours may be given a lower weight compared to off-hour accesses), another factor, or any combination thereof. For example, during a one week period, the event logs may indicate that, on average, individual resources were accessed 2.3 times per hour while a particular resource was accessed 5 times in three different hours. The risk indicator may be weighted to give more weight to the more frequently accessed resource.

A system administrator or security professional may create rules that determine how the risk indicator is calculated. The event logs that are analyzed to determine the risk indicator may include event logs associated with (a) file activities (e.g., reads, writes, moves, copies, etc.) associated unstructured (or semi-structured) files that have been automatically classified by a classifier, (b) lightweight directory access protocol (LDAP) queries, (c) directory service administration changes, (d) mail server administration changes, (e) sentiment analysis of communications (e.g., email, instant messages, and the like) that identifies whether the communications are indicative of a user that may engage in high risk activities, (f) high volume activities, (g) database activities (e.g., classified databases, unclassified databases or both), other types of activities, or any combination thereof. To determine a classification of a document that includes unstructured (or semi-structured) data, a classifier (or other machine learning algorithm) may be used to scan the contents of the document and associate a classification with the document based on the contents of the document. For example, the classifier may examine a document that includes information associated with an office football pool and classify the document as public information or internal information. The classifier may examine a document that includes information expense reports with credit card information and classify the document as confidential information or restricted information. A classifier may crawl through unstructured documents stored in an enterprise's document storage facility (e.g., SharePoint®), examine the contents of individual documents, and associate a classification with the individual documents based on examining the contents. In some cases, the classifier application may use sentiment analysis on emails, instant messages, text messages, or other communications to determine a sentiment of a user account and take into account the sentiment when determining a risk indicator. For example, a user account that has sent more than a threshold number of negative emails (or other communications) may be used to determine that the user account has a high risk indicator, e.g., indicating that the user account is likely to engage in high risk activities.

Thus, a risk indicator may be determined for individual user accounts that have relatively high (e.g., unrestricted) access privileges by analyzing event logs generated as a result of activities performed by the user accounts within a period of time. A risk indicator may be determined for each activity identified by an event log. Thus, multiple risk indicators may be determined for multiple event logs occurring in the period of time. A cumulative risk indicator may be determined for the period of time based on the individual risk indicators determined for each event log. The start time and end time of the period of time may be adjusted to select a next time period with a next set of event logs, risk indicators may be determined for each event log in the next set of event logs, and a cumulative risk indicator determined for the next time period, and so on. The risk indicators and the cumulative risk indicators may be graphed over a period of time to determine whether the user account is engaging in increasingly riskier actions, to identify when the user account engaged in high risk activities, etc. The risk indicators and the cumulative risk indicators may take into account multiple factors, such as, for example, one or more event logs generated within a particular time period (e.g., a sliding time window), resources that were accessed by the activities, a frequency with which the resources were accessed within the particular time period, a classification (e.g., public, internal, confidential, or restricted) associated with the resources that were accessed, a location of individual resources that were accessed within the particular time period, a severity associated with the activities, a context associated with one or more events, another factor based on information provided by the event logs, or any combination thereof.

The context associated with a particular event log may take into consideration other factors surrounding the particular event log. For example, when a user account performs a content read of a resource, the context may include whether the user account is an owner of the resource. In this example, when a user account that owns a resource reads the contents of the resource, the event log generated by the read activity may be assigned a low risk, and when a user account that does not own a resource reads the contents of the resource, the event log generated by the read activity may be assigned a high risk because of the context. As another example, one or more event logs may provide a context for a subsequent event log. To illustrate, if a user account that does not own a resource grants read access to the user account (or a second user account) and, within a predetermined period of time, the user account (or the second user account) reads the contents of the resource, then the read activity may be assigned a high risk. In this example, an event log granting the read access provides context to the subsequent read event log. Thus, a read event log that, typically, may be assigned a low risk activity may be identified as a high risk activity based on the context (e.g., a non-owner granting read access to a resource within a predetermined period of time prior to the read event).

In some cases, a sigmoid-based function or a weighting may be used to accentuate high risk activities, high level resources, or other factors. For example, a system administrator or a security professional may adjust the sigmoid-based function or weighting to accentuate specific factors based on the goals of the enterprise in identifying high risk user accounts.

FIG. 1 is a block diagram illustrating a computing system 100 that includes auditing software to monitor event logs according to some embodiments. The computing system 100 may include multiple types of network elements, including a representative one or more databases, such as a database 102(1) to a database 102(M), a representative one or more user devices, such as a user device 104(1) to a user device 104(N), and a representative one or more servers, such as a server 106(1) to a server 106(P), where M>1, N>1, and P>1, and where M, N, and P are not necessarily the same. Of course, the computing system 100 may include other network elements in addition to the databases 102, the user devices 104, and the servers 106. The user devices 104 may include workstations, laptops, tablets, wireless phones, other types of computing devices used to access network elements of the computing system 100, or any combination thereof.

Individual network elements of the computing system 100 may have an associated agent that monitors a particular network element and generates an event log, such as one of event logs 114(1) to 114(Q) (where Q>1), when an event occurs. For example, each of the agents 108(1) to 108(M) may be associated with a particular one of the databases 102(1) to 102(M) (e.g., the agent 108(1) may be associated with the database 102(1) and the agent 108(M) may be associated with the database 102(M)). The agents 108 may monitor the databases 102 and generate one of the event logs 114 when a particular event occurs. For example, the agents 108 may generate an event log each time one of the databases 102 is accessed, e.g., each time (i) data is added to one of the databases 102, (ii) deleted from one of the databases 102, (iii) changed in one of the databases 102, or (iv) data is read from one of the databases 102. In some cases, individual databases of the databases 102 may have an associated classification (e.g., public, internal, classified, or restricted) based on the types of data stored in the databases 102. For example, the database 102(1) may have a "public" classification, a database 102(2) may have an "internal" classification, a database 102(3) may have a "confidential" classification, and a database 102(4) may have a "restricted" classification.

Each of the agents 110(1) to 110(N) may be associated with a particular one of the user devices 104(1) to 104(N) (e.g., the agent 110(1) may be associated with the user device 104(1) and the agent 110(N) may be associated with the user device 104(N)). The agents 110 may monitor the user devices 104 and generate one of the event logs 114 when a particular event occurs. For example, the agents 110 may generate an event log each time a login occurs on one of the user devices 104, each time of the user devices 104 is used to access one of the databases 102 or one of the servers 106, etc. In some cases, individual user devices of the user devices 104 may have an associated classification (e.g., public, internal, classified, or restricted) based on the types of documents to which the individual user devices have access.

Each of agents 112(1) to 112(P) may be associated with a particular one of the servers 106(1) to 106(P) (e.g., the agent 112(1) may be associated with the server 106(1) and the agent 112(P) may be associated with the server 106(P)). The agents 110 may monitor the servers 106 and generate one of the event logs 114 when a particular event occurs. For example, the agents 112 may generate an event log each time one of the servers 106 is accessed. In some cases, individual servers of the server 106 may have an associated classification (e.g., public, internal, classified, or restricted) based on a type of data stored of the individual servers. For example, the server 106(1) may have a "public" classification, a server 106(2) may have an "internal" classification, a server 106(3) may have a "confidential" classification, and a server 106(4) may have a "restricted" classification.

A central server 116 may receive the event logs 114(1) to 114(Q) from one or more of the agents 108, 110, or 112 via a network 118. The central server 116 may store at least a portion of the event logs 114 in a database, such as an event log database 120. For example, the central server 116 may store a portion of the events logs 114 that are classified as sufficiently important to be stored. As another example, each of the event logs 114 may be assigned a priority and deleted from the database at a predetermined time based on the priority. For example, low priority event logs may be deleted from the event log database 120 after a relatively short time while higher priority event logs may not be deleted from the event log database 120 or may be deleted after a much longer period of time.

The central server 116 may include one or more processors and one or more computer readable storage media to store a software application 122. The software application 122 may be executed by the one or more processors of the central server 116 to perform various functions. For example, the software application 122 may receive an identifier, analyze and correlate events stored in the event log database 120, group the events based on location, identify sessions in each group of events, and render the sessions for display on a display device, such as a monitor device.

The agents 108, 110, and 112 may monitor events (e.g., activities) occurring at network elements (e.g., components) of the network 118, such as the databases 102, the user devices 104, and the servers 106. For example, the agents 108 may monitor activities that user accounts perform on the databases 102, including actions such as reading data from the databases 102, writing data to the databases 102, modifying data stored in the databases 102, deleting data stored in the databases 102, etc. The agents 108 may monitor which action(s) are being performed to the databases 102, to which of the databases 102(1) to 102(M) the action(s) are being performed, which user accounts are initiating the action(s), how many action(s) each of the user accounts is performing in a predetermined period of time, etc.

The agents 110 may monitor activities associated with the user devices 104, such as user accounts used to login to each of the user devices 104, which network elements (e.g., the databases 102 or the servers 106) are being accessed by the user accounts, the classification associated with the network elements that are being accessed, how frequently the network elements are being accessed, the type of activities being performed, etc.

The agents 112 may monitor activities associated with the servers 106, such as how each of the servers 106 is being accessed, which network elements (e.g. the user devices 104) are accessing each of the servers 106, a number of transactions received by each of the servers 106, a number of transactions sent by each of the servers 106, a number of transactions processed by each of the servers 106, classifications associated with contents of each of the servers 106, how frequently each of the servers 106 is being accessed, the type of actions being performed, etc.

The agents 108, 110, and 112 may generate the event logs 114(1) to 114(Q) (where Q>1) based on monitoring the activities associated with the databases 102, the user devices 104, and the servers 106, respectively. Each of the event logs 114 may be associated with one or more activities. For example, the event log 114(1) may be associated with the occurrence of a single activity and the event log 114(Q) may be associated with the occurrence of more than one activity. To illustrate, one of the event logs 114 may be generated each time data stored in one of the databases 102 is accessed. The activities (e.g., X number of transactions performed within Y seconds, where X>0 and Y>0) that cause the event logs 114 to be generated may be defined by a system administrator, determined using a classifier (e.g., trained using machine learning), or a combination of both, e.g., determined using a classifier and then adjusted by the system administrator.

The software application 122 may receive the event logs 114 from one or more of the agents 108, 110, or 112. In some cases, the software application 122 may receive the event logs 114 and determine which of the event logs 114 to store (e.g., archive) in the event log database 120. For example, a portion of the event logs 114(1) to 114(Q) may be stored in the event log database 120 while a remainder of the event logs 114 may not be stored in the event log database 120.

Each of the event logs 114 may include multiple fields with information describing the event being logged. For example, the event log 114(Q) may include user account 124, resource 126, location 128, classification 130, activity 132, and severity 134. The user account 124 may identify a user account associated with the activity that caused the event log 114(Q) to be generated. For example, when the event log 114(Q) is caused by a read activity, the user account 124 may identify the user account that performed the read activity. When the event log 114(Q) is caused by a write activity, the user account 124 may identify the user account that performed the write activity. The resource 126 may identify the resource (e.g., a file, a directory, a server, a database, etc.) associated with the activity. For example, the event log 114(Q) may identify that the activity 132 (e.g., a read activity, a write activity, etc.) was performed to a file (e.g., the resource 126). The location 128 may identify a location of the resource 126, e.g., such as one of the databases 102, one of the user devices 102, or one of the servers 106. The location 128 may include geographic location, such as second server on shelf three of rack ten on the third floor of the building located on Fifth Street, in Austin, Tex., USA.

The classification 130 may identify a classification of the resource 126, such as whether the resource 126 is classified as public, internal, restricted, or confidential. The activity 132 may identify the type of activity that was performed, such as a read activity, a write activity, a modify activity, a grant of access, a change in permissions, another type of computer system related activity, or any combination thereof. Structured data refers to information that is organized to a large extent (e.g., based on the relationships within the data). Information that is stored in a database (e.g., a relational database) is an example of structured data. Unstructured data refers to information that is not organized, such as, for example, e-mail messages, word processing documents, videos, photos, audio files, presentations, webpages, and other types of documents. Structured data may be organized in such a way that one or more fields in the database each have a classification or a classification for one or more fields is easily determined. For example, a field in a database that is labeled "credit card information" or "social security number" may easily be identified as having a high-level (e.g., restricted or confidential) classification. To determine a classification of a document that includes unstructured data, a classifier (or other machine learning algorithm) may be used to scan the contents of the document and associate a classification with the document based on the contents of the document. For example, the classifier may examine a document that includes information associated with an office football pool and classify the document as public information or internal information. The classifier may examine a document that includes information expense reports with credit card information and classify the document as confidential information or restricted information. A classifier may crawl through unstructured documents stored in an enterprise's document storage facility (e.g., SharePoint®), examine the contents of individual documents, and associate a classification with the individual documents based on examining the contents. In some cases, the classifier application may use sentiment analysis on emails, instant messages, text messages, or other communications to determine a sentiment of a user account and take into account the sentiment when determining a risk indicator. For example, a user account that has sent more than a threshold number of negative emails (or other communications) may be used to determine that the user account has a high risk indicator, e.g., indicating that the user account is likely to engage in high risk activities.

The severity 134 may be assigned by the agent that generated the event log 114(Q) and may identify a severity based on the resource 126 that was accessed, the location 128 of the resource 126, the classification 130 of the resource 126, the activity 132 that was performed, or any combination thereof. The severity 134 may be an integer, a real number, etc. For example, a simple severity scheme from 1 to 3 may use high severity (e.g., "3"), medium severity (e.g., "2"), and low severity (e.g., "1"). To illustrate, one failed login attempt may be assigned a low severity whereas multiple failed login attempts on multiple user devices within a predetermined period of time may be assigned a high severity. Of course, the severity scheme may be expanded, such as having high severity as "10" and low severity as "1" etc. The severity associated with a particular alert profile or with a particular event log may be determined by a classifier trained using machine learning, by a system administrator, or both.

The event logs 114 may be stored (e.g., archived) in the event log database 120 to create stored event logs 136. The software application 122 may select a set of event logs 138 from the stored event logs 136 based on a time period 138. For example, each event log of the set of event logs 138 may have a timestamp that occurs within the time period 138. The software application 122 may determine a risk indicator for each event log in the set of event logs 138 to create a set of risk indicators 142. The software application 122 may determine a cumulative risk indicator 148 for the time period 140 determined by the software application 122. The cumulative risk indicator 148 for the time period 140 may include an average of the risk indicators 142 associated with the set of event logs 138 occurring in the time period 140, a median of the risk indicators 142, a sum of the risk indicators 142, a highest risk indicator of the risk indicators 142, or any combination thereof.

The software application 122 may determine a risk indicator for each event log in the set of event logs 138 based on the resource 126 associated with each event log, the location 128 of the resource 126, the classification 130 of the resource 126, the activity 132, the severity 134, one or more context rules 144, and one or more risk functions 146. The context rules 144 may include rules that take into consideration one or more of the user account 124, the resource 126, the location 128, the classification 130, the activity 132, the severity 134, other information include in the event log 114(Q), or any combination thereof. For example, the context rules 144 may include a rule that when the activity 132 is a read action and the user account 124 has Administrative privileges, the activity 132 is a high risk activity. The context rules 144 may include a rule that when the activity 132 is a read action of the resource 126 and the user account 124 is not identified as an owner of the resource 126, the activity 132 is a high risk activity. The context rules 144 may include a rule that when the activity 132 is a read action of the resource 126 and the user account 124 was recently (e.g., within a predetermined period of time) provided with read access to the resource 126, the activity 132 is a high risk activity. The context rules 144 may include a rule that when the activity 132 is a write action to the resource 126 and the user account 124 is not identified as an owner of the resource 126, the activity 132 is a high risk activity. The context rules 144 may include a rule that when the activity 132 is a write action to the resource 126 and the user account 124 is not identified as an owner of the resource 126, the activity 132 is a high risk activity. The context rules 144 may include a rule that when the activity 132 is a write action to the resource 126 and the user account 124 is not an owner of the resource 126, the activity 132 is a high risk activity. For example, metadata associated with the resource 126 may identify one or more owners of the resource 126 and may indicate that the user account 124 is not one of the owners. The context rules 144 may include a rule that when one or more actions (e.g., a read action, a write action, or a combination of both) are performed on multiple resources that are located in a same location (e.g., same folder, same directory, same database, same server, or the like), the activity 132 is a high risk activity. For example, if an event log and a subsequent event log indicate that one or more resources located in the same location were accessed within a predetermined period of time (e.g., N minutes, where N>0) by the user account 124, the activity 132 identified in the subsequent event log may be a high risk activity. The context rules 144 may include a rule that when one or more actions (e.g., a read action, a write action, or a combination of both) are performed on multiple resources that are located in similar locations (e.g., similar folders, similar directories, similar databases, similar servers, or the like), the activity 132 is a high risk activity. For example, a credit card field that is common to multiple databases may be considered a similar location. A read activity performed to the credit card field of multiple databases may be considered a high risk activity.

The risk functions 146 may include an activity context function that uses the context rules 144 to determine a risk indicator for an event log. For example the activity context function may examine clusters of event logs in the time period 140 and identify increased risk when activities are associated with resources in a same or similar location. In some cases, the activity context function may take into consideration the activity event severity 134 as part of the context of the activity when determining the risk indicator associated with an event log. The risk functions 146 may include an event frequency function that takes into account how frequently a particular type of event occurs within the time period 140. For example, a type of event that occurs more than a threshold percentage (e.g., 10%, 20%, 30%, or the like) may cause the risk indicator for the particular type of event to increase. To illustrate, if the set of event logs 138 indicate that a read activity associated with a particular resource occurs more than 30% of the time during the time period 140, then the read activity may be assigned a higher risk compared to if it occurs less than 30% of the time. The risk functions 146 may include a risk inflation function (e.g., a sigmoid-based function or a weighting function) that enables enterprises to accentuate high risk indicators.

For example, the risk 'R' associated with the event log 114(Q) may be determined using the formula:

$$R = S(I(\text{Res}), A) * F(\text{Res}, A))$$

where:
  * indicates multiplication,
  S is an activity context function (e.g., one of the risk functions 146) that takes context into consideration using the context rules 144,
  I is a risk inflation function (e.g., a sigmoid function or a weighting), e.g., one of the risk functions 146,
  Res is the resource 126, and
  A is the set of event logs 138.

Thus, in the computing system 100, the agents 108, 110, and 112 may monitor activities associated with various network elements, such as the databases 102, the user devices 104, and the servers 106. The agents 108, 110, 112 may generate the one or more event logs 114 based on monitoring the activities. Each of the event logs 114 may be associated with one (or more) activities. The event logs 114 may be sent to the central server 116 and stored in the event log database 120 as the stored event logs 134. The software application 122 may select the set of event logs 138 occurring in the time period 140 and associated with a particular user account (e.g., the user account 124) and determine one or more of the risk indicators 142, such as a risk indicator associated with each event log in the set of event logs 138 and the cumulative risk indicator 148 associated with the time period 140. In some cases, additional risk indicators may be determined for additional time periods. The risk indicators 142 may be displayed as a graph to identify event logs that indicate high risk activity, time periods during which high risk activities took place, or both.

Figure 2:
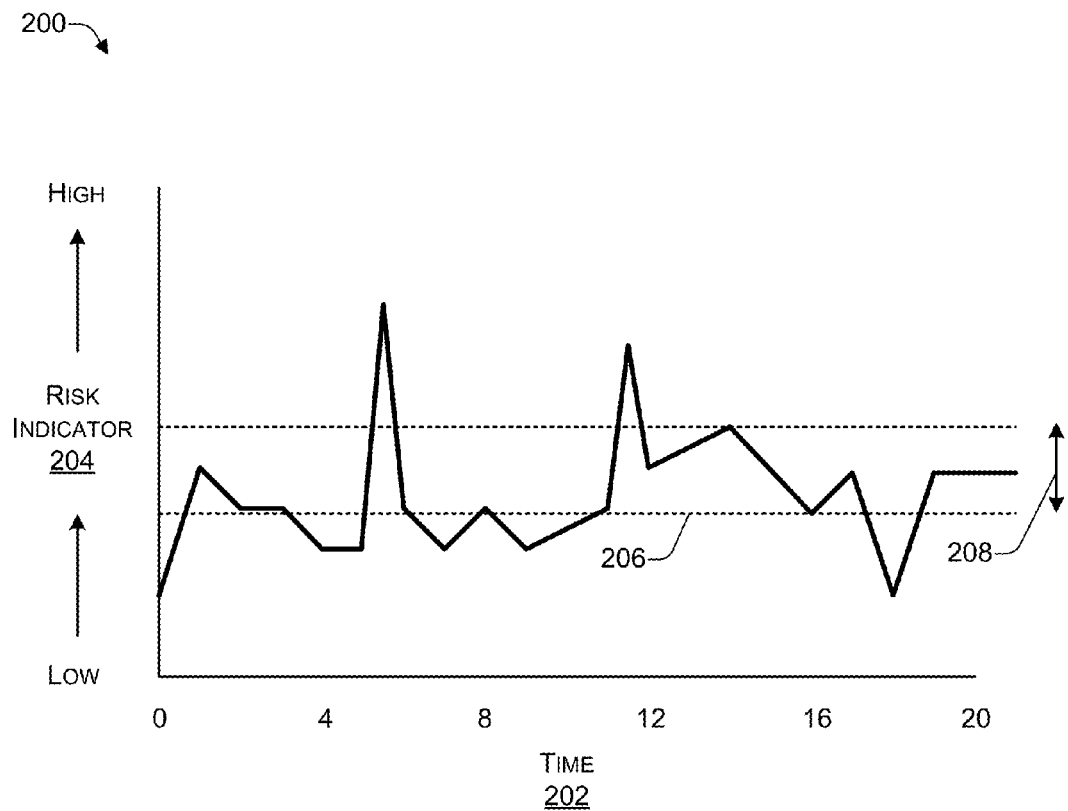
FIG. 2 is a block diagram illustrating graphs of risk indicators according to some embodiments.
Figure 2:
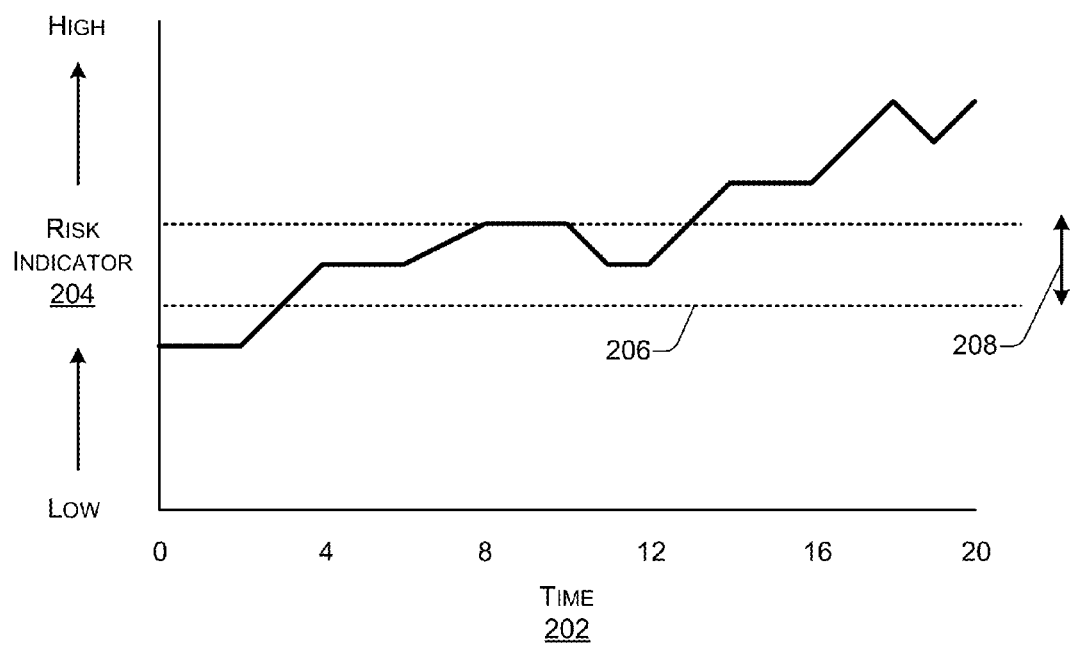

FIG. 2 is a block diagram illustrating graphs 200 of risk indicators according to some embodiments. In the graphs 200, the x-axis may represent time 202 (e.g., minutes, hours, or days) and the y-axis may represent a value of a risk indicator 204. The risk indicator 204 may be a risk indicator associated with an event log or the cumulative risk indicator 148 associated with a time period. A baseline 206 may be determined based on an average of the risk indicators 204 over the time 202, a median of the risk indicators 204 over the time 202 or the baseline 206 may be set by a system administrator, etc. A threshold 208 may be determined based on machine learning, based on the average (or the median) of the risk indicators 204 over the time 202, or set by a system administrator. High risk activities may occur during the time 202 when the risk indicator 204 exceeds the baseline 206 by more than the threshold amount 208. For example, in the top graph illustrated in the top half of FIG. 2, high risk activities occurred at approximately when time=6 and when time=11. As another example, in the bottom graph illustrated in the bottom half of FIG. 2, high risk activities occurred at approximately from time=13 onwards (e.g., until at least time=20). Based on an analysis of when the high risk activities took place, a system administrator may perform further analysis.

In the flow diagrams of FIGS. 3, 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, and 600 are described with reference to FIG. 1 or 2 as described above, although other models, frameworks, systems and environments may implement these processes.

Figure 3:
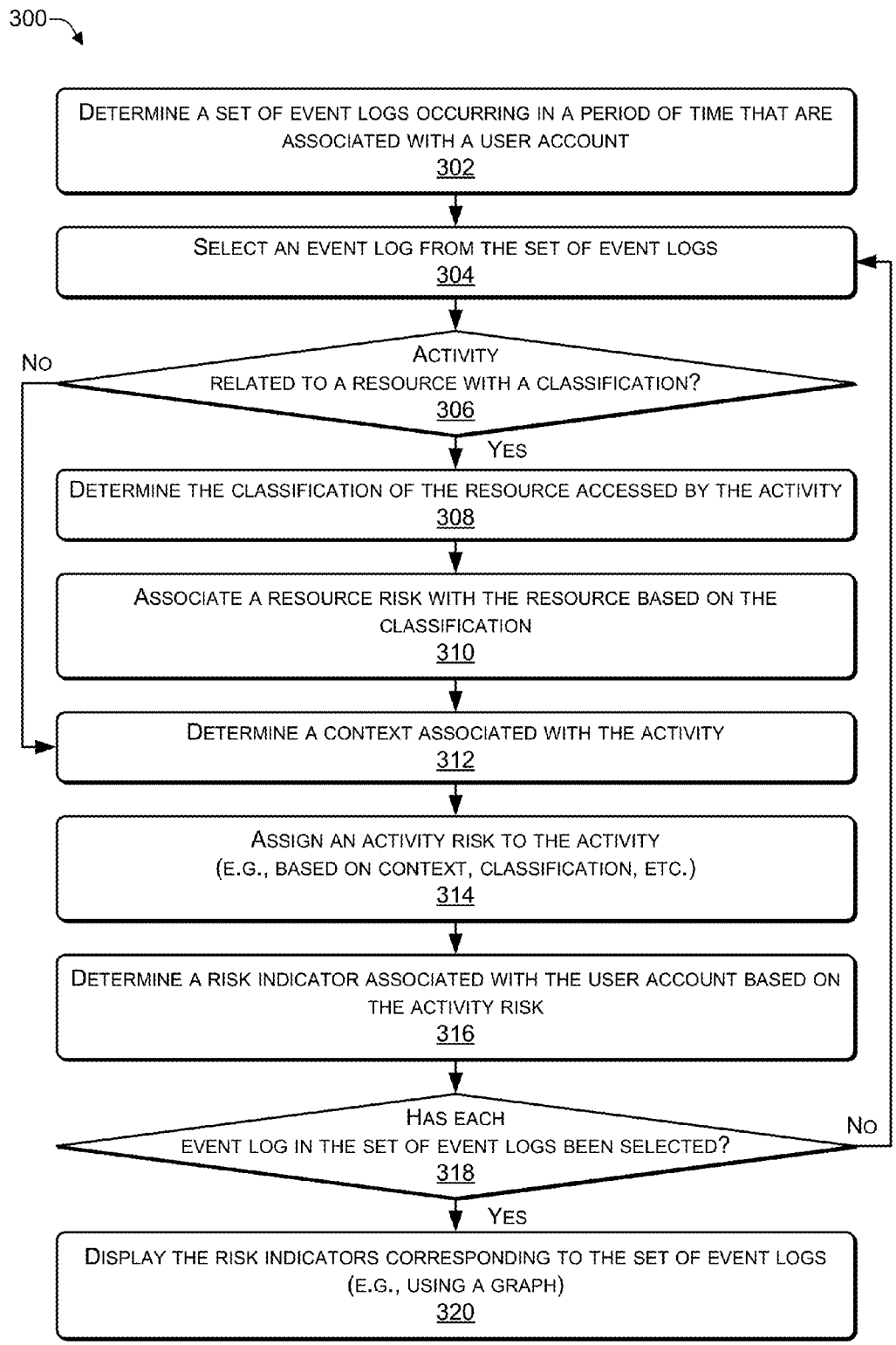
FIG. 3 is a flowchart of a process that includes determining a risk indicator associated with a user account according to some embodiments.

FIG. 3 is a flowchart of a process 300 that includes determining a risk indicator associated with a user account according to some embodiments. The process 300 may be performed by the software application 122 of FIG. 1.

At 302, a software application may determine a set of activity event logs that occur within a period of time and that are associated with a user account. At 304, an event log from the set of event logs may be selected. The event log may be generated as a result of an activity. At 306, a determination may be made whether a resource accessed by an activity (e.g., identified in the event log) has an associated classification. In response to determining, at 306, that the resource accessed by the activity has an associated classification, the classification associated with the resource is determined, at 308, a resource risk is associated with the resource based on the classification, at 310, and the process proceeds to 312. For example, in FIG. 1, the software application 122 may retrieve the set of event logs 138 from the stored event logs 136. The set of event logs 138 may include logs that were generated within the time period 140 and are associated with the user account 124. The software application 122 may select the event log 114(Q) (where Q>0) and determine one or more of the resource 126, the location 128, the classification 130, the activity 132, or the severity 134. A resource risk associated with the resource 126 may be determined based on the classification 130. For example, a resource with a high level classification (e.g., restricted or classified) may have a high resource risk while a resource with a low level classification (e.g., public or internal) may have a low resource risk.

In response to determining, at 306, that the resource accessed by the activity does not have an associated classification, the process proceeds to 312. At 312, a context associated with activity may be determined. At 314, an activity risk may be assigned to the activity (e.g., based on one or more of the context, the resource classification, or another factor). At 316, a risk indicator associated with the user account may be determined based on the activity risk. The software application 122 may determine a context associated with the event log 114(Q) based on other logs in the set of event logs 138, and may assign an activity risk to the activity 132 based on one or more of the context or the classification 130. The software application 122 may determine (e.g., based on the activity risk) a risk indicator (e.g., one of the risk indicators 142) associated with event logs 114(Q), e.g., associated with the user account 124 performing the activity 132.

At 318, a determination may be made whether each event log in the set of event logs has been selected. In response to determining, at 318, that each event log in the set of event logs has been selected, the risk indicators corresponding to the set of event logs may be displayed (e.g., in graphical form), at 320. In response to determining, at 318, that not all of the event logs in the set of event logs have been selected, the process may proceed to 304, to select a next event log from the set of event logs. Thus, one or more of 304, 306, 308, 310, 312, 314, and 316 may be repeated for individual event logs in the set of event logs until all of the logs in the set of event logs 138 have been selected. For example, in FIG. 1, the software application 122 may determine whether all of the event logs in the set of event logs 138 have been selected. If all of the event logs in the set of event logs 138 have not been selected, then the software application 122 may select a next event logs from the set of event logs 138. If all of the event logs in the set of event logs 138 have been selected, the individual risk indicators 142 corresponding to individual event logs of the set of event logs 138 may be displayed, e.g., as illustrated in FIG. 2, to enable high risk activities associated with the user account 124 to be identified.

Thus, a software application may identify a set of event logs generated as a result of a user account performing activities within a predetermined time period. The software application may determine information associated with each event log, such as a type of activity that was performed (e.g., read, write, modify, etc.), a context of the activity, a resource that was accessed by the activity, a classification of the resource, a location of the resource, other information associated with each event log, or any combination thereof. The software application may determine a risk indicator associated with each event log based on the information, context rules, and risk functions. After determining a risk indicator for each event log in the set of event logs, the software application may display the risk indicators for the set of event logs. For example, graphing the risk indicators may enable high risk activities to be easily identified, e.g., as illustrated in FIG. 2.

Figure 4:
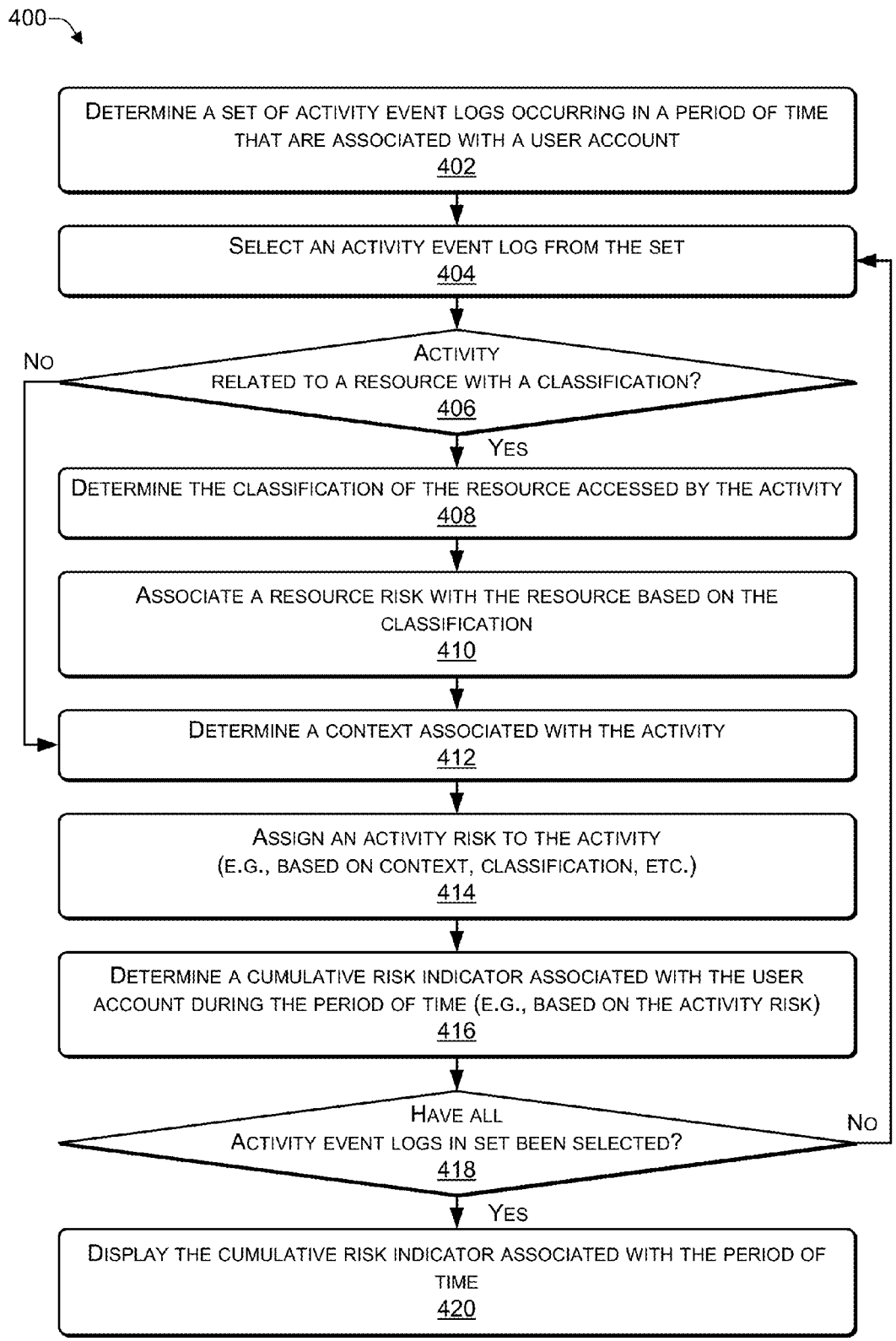
FIG. 4 is a flowchart of a process that includes determining a cumulative risk indicator according to some embodiments.

FIG. 4 is a flowchart of a process 400 that includes determining a cumulative risk indicator according to some embodiments. The process 400 may be performed by the software application 122 of FIG. 1.

At 402, a software application may determine a set of activity event logs that occur within a period of time and that are associated with a user account. At 404, an event log from the set of event logs may be selected. The event log may be generated as a result of an activity. At 406, a determination may be made whether a resource accessed by the activity (e.g., identified in the event log) has an associated classification. In response to determining, at 406, that the resource accessed by the activity has an associated classification, the classification associated with the resource is determined, at 408, a resource risk is associated with the resource based on the classification, at 410, and the process proceeds to 412. For example, in FIG. 1, the software application 122 may retrieve the set of event logs 138 from the stored event logs 136. The set of event logs 138 may include logs that were generated within the time period 140 and are associated with the user account 124. The software application 122 may select the event log 114(Q) (where Q>0) and determine one or more of the resource 126, the location 128, the classification 130, the activity 132, or the severity 134. A resource risk associated with the resource 126 may be determined based on the classification 130. For example, a resource with a high level classification (e.g., restricted or classified) may have a high resource risk while a resource with a low level classification (e.g., public or internal) may have a low resource risk.

In response to determining, at 406, that the resource accessed by the activity does not have an associated classification, the process proceeds to 412. At 412, a context associated with activity may be determined. At 414, an activity risk may be assigned to the activity (e.g., based on one or more of the context, the resource classification, or another factor). At 416, a cumulative risk indicator associated with the period of time may be determined. For example, in FIG. 1, the software application 122 may determine a context associated with the event log 114(Q) based on other logs in the set of event logs 138, and assign an activity risk to the activity 132 based on one or more of the context or the classification 130. The software application 122 may determine (e.g., based on the activity risk) a risk indicator (e.g., one of the risk indicators 142) associated with event logs 114(Q), e.g., associated with the user account 124 performing the activity 132. The risk indicator may be grouped with previously determined risk indicators to determine the cumulative risk indicator. For example, the cumulative risk indicator may include a sum (e.g., a running total may be determined at 416) of the risk indicators associated with the set of event logs, an average of the risk indicators associated with the set of event logs, a median of the risk indicators associated with the set of event logs, another type of cumulative risk indicator that takes into account the risk indicator determined for each event log in the set of event logs, or any combination thereof.

At 418, a determination may be made whether each event log in the set of event logs has been selected. In response to determining, at 418, that each event log in the set of event logs has been selected, the cumulative risk indicator corresponding to the period of time may be displayed (e.g., in graphical form), at 420. In response to determining, at 418, that not all of the event logs in the set of event logs have been selected, the process may proceed to 404, to select a next event log from the set of event logs. Thus, one or more of 404, 406, 408, 410, 412, 414, and 416 may be repeated for individual event logs in the set of event logs until a risk indicator has been determined for each of the event logs in the set of event logs 138 and a cumulative risk indicator for the time period has been determined. For example, in FIG. 1, the software application 122 may determine whether all of the event logs in the set of event logs 138 have been selected. If all of the event logs in the set of event logs 138 have not been selected, then the software application 122 may select a next event logs from the set of event logs 138. If all of the event logs in the set of event logs 138 have been selected, the cumulative risk indicator 148 corresponding to the time period 140 may be displayed. In some cases, a cumulative risk indicator may be determined for multiple time periods and the multiple cumulative risk indicators displayed using a graph or other visual depiction. For example, a cumulative risk indicator may be determined for each hour in a 24 hour period and displayed to identify during which hour(s) the highest risk activities took place. As another example, a cumulative risk indicator may be determined for each day in a month and displayed to identify during which days the highest risk activities took place.

Thus, a software application may identify a set of event logs generated as a result of a user account performing activities within a predetermined time period. The software application may determine information associated with each event log, such as a type of activity that was performed (e.g., read, write, modify, etc.), a context of the activity, a resource that was accessed by the activity, a classification of the resource, a location of the resource, other information associated with each event log, or any combination thereof. The software application may determine a risk indicator associated with each event log based on the information, context rules, and risk functions. Based on determining a risk indicator for each event log in the set of event logs, the software application may determine and display a cumulative risk indicator. For example, graphing the risk indicators may enable high risk activities to be easily identified, e.g., as illustrated in FIG. 2.

Figure 5:
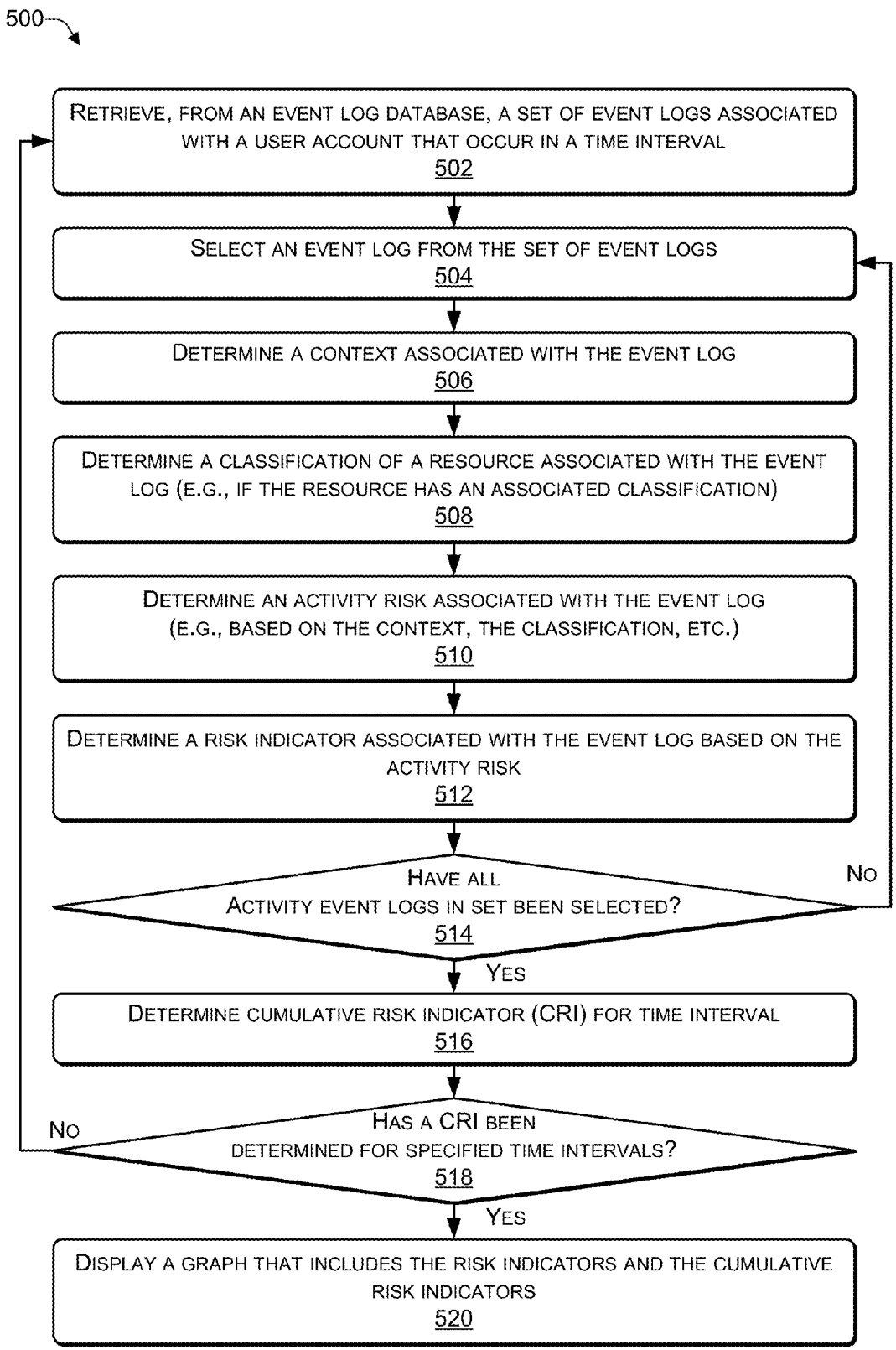
FIG. 5 is a flowchart of a process that includes determining a risk indicator and determining a cumulative risk indicator according to some embodiments.

FIG. 5 is a flowchart of a process 500 that includes determining a risk indicator and determining a cumulative risk indicator according to some embodiments. The process 500 may be performed by the software application 122 of FIG. 1.

At 502, a software application may determine a set of activity event logs that occur within a time interval and that are associated with a user account. At 504, an event log from the set of event logs may be selected. The event log may be generated as a result of an activity. At 506, a context associated with the event log may be determined. At 508, a classification associated with a resource accessed by an activity (e.g., identified in the event log) may be determined (e.g., if the resource has an associated classification). For example, in FIG. 1, the software application 122 may retrieve the set of event logs 138 from the stored event logs 136. The set of event logs 138 may include logs that were generated within the time period 140 and are associated with the user account 124. The software application 122 may select the event log 114(Q) (where Q>0) and determine one or more of the resource 126, the location 128, the classification 130, the activity 132, or the severity 134. A resource risk associated with the resource 126 may be determined based on the classification 130. For example, a resource with a high level classification (e.g., restricted or classified) may have a high resource risk while a resource with a low level classification (e.g., public or internal) may have a low resource risk.

At 510, an activity risk may be associated with the event log. At 512, a risk indicator associated with the event log may be determined. For example, in FIG. 1, the software application 122 may determine a context associated with the event log 114(Q) based on other logs in the set of event logs 138, and may assign an activity risk to the activity 132 based on one or more of the context or the classification 130. The software application 122 may determine (e.g., based on the activity risk) a risk indicator (e.g., one of the risk indicators 142) associated with event logs 114(Q), e.g., associated with the user account 124 performing the activity 132.

At 514, a determination may be made whether all the event logs in the set of event logs has been selected. In response to determining, at 514, that all the event logs in the set of event logs has been selected, a cumulative risk indicator may be determined for the time interval, at 516, and the process may proceed to 518. For example, the cumulative risk indicator may include a sum of the risk indicators associated with the set of event logs, an average of the risk indicators associated with the set of event logs, a median of the risk indicators associated with the set of event logs, another type of cumulative risk indicator that takes into account the risk indicator determined for each event log in the set of event logs, or any combination thereof.

In response to determining, at 514, that not all of the event logs in the set of event logs have been selected, the process may proceed to 504, to select a next event log from the set of event logs. Thus, one or more of 504, 506, 508, 510, 512, and 514 may be repeated for individual event logs in the set of event logs until a risk indicator has been determined for each of the event logs in the set of event logs. For example, in FIG. 1, the software application 122 may determine whether all of the event logs in the set of event logs 138 have been selected. If all of the event logs in the set of event logs 138 have not been selected, then the software application 122 may select a next event logs from the set of event logs 138.

At 518, a determination may be made whether a cumulative risk indicator has been determined for each specified time interval. In response to determining, at 518, that a cumulative risk indicator has not been determined for each specified time interval, the process may proceed to 502, where a next set of event logs associated with the user account may be selected for a next time interval. In response to determining, at 518, that a cumulative risk indicator has been determined for each specified time interval, the process may proceed to 520, where multiple risk indicators and multiple cumulative risk indicators are displayed, e.g., using a graph or other visual depiction.

Thus, a software application may identify a set of event logs generated as a result of a user account performing activities within a set of specified time periods. The software application may determine information associated with each event log in each time period, such as a type of activity that was performed (e.g., read, write, modify, etc.), a context of the activity, a resource that was accessed by the activity, a classification of the resource, a location of the resource, other information associated with each event log, or any combination thereof. The software application may determine a risk indicator associated with each event log in each time period based on the information, context rules, and risk functions. Based on determining a risk indicator for each event log in each set of event logs, the software application may determine and display multiple risk indicators for each time period and multiple cumulative risk indicators for multiple time periods. Graphing the risk indicators and the cumulative risk indicators may enable time periods during which the user account engaged in high risk activities to be easily identified, e.g., as illustrated in FIG. 2.

Figure 6:
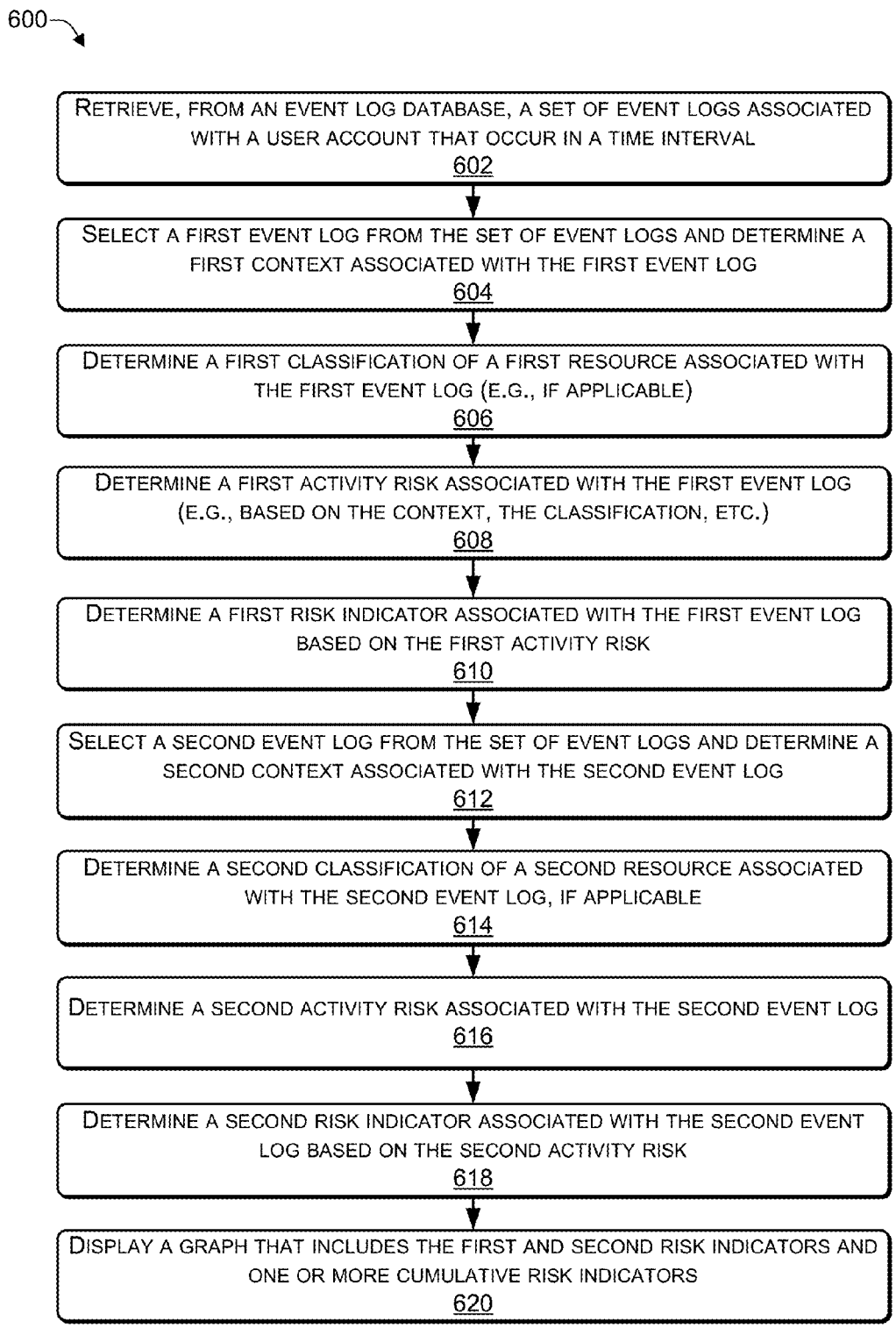
FIG. 6 is a flowchart of a process that includes determining a first risk indicator and a second risk indicator according to some embodiments.

FIG. 6 is a flowchart of a process 600 that includes determining a first risk indicator and a second risk indicator according to some embodiments. The process 600 may be performed by the software application 122 of FIG. 1.

At 602, a software application may determine a set of activity event logs that occur within a time interval and that are associated with a user account. At 604, a first event log from the set of event logs may be selected and a first context associated with the first event log may be determined. At 606, a first classification associated with a first resource (e.g., identified in the first event log) may be determined (e.g., if the first resource has an associated first classification). At 608, a first activity risk associated with the first event log may be determined. At 610, a first risk indicator associated with the first event log may be determined. At 612, a second event log from the set of event logs may be selected and a second context associated with the second event log may be determined. At 614, a second classification associated with a second resource (e.g., identified in the second event log) may be determined (e.g., if the second resource has an associated second classification). At 616, a second activity risk associated with the second event log may be determined. At 618, a second risk indicator associated with the second event log may be determined. For example, in FIG. 1, the software application 122 may retrieve the set of event logs 138 from the stored event logs 136. The set of event logs 138 may include logs that were generated within the time period 140 and are associated with the user account 124. The software application 122 may select the event log 114(Q) (where Q>0) and determine one (or more) of the resource 126, the location 128, the classification 130, the activity 132, or the severity 134. A resource risk associated with the resource 126 may be determined based on the classification 130. For example, a resource with a high level classification (e.g., restricted or classified) may have a high resource risk while a resource with a low level classification (e.g., public or internal) may have a low resource risk.

For example, in FIG. 1, the software application 122 may determine a context associated with the event log 114(Q) based on other logs in the set of event logs 138, and may assign an activity risk to the activity 132 based on one or more of the context or the classification 130. The software application 122 may determine (e.g., based on the activity risk) a risk indicator (e.g., one of the risk indicators 142) associated with event logs 114(Q), e.g., associated with the user account 124 performing the activity 132.

At 620, the first and second risk indicators and one or more cumulative risk indicators may be displayed, e.g., using a graph or other visual depiction. For example, risk indicators, cumulative risk indicators, or both may be graphed, as illustrated in FIG. 2.

Thus, a software application may identify a set of event logs generated as a result of a user account performing activities within a set of specified time periods. The software application may determine information associated with each event log in each time period, such as a type of activity that was performed (e.g., read, write, modify, etc.), a context of the activity, a resource that was accessed by the activity, a classification of the resource, a location of the resource, other information associated with each event log, or any combination thereof. The software application may determine a risk indicator associated with each event log in each time period based on the information, context rules, and risk functions. Based on determining a risk indicator for each event log in each set of event logs, the software application may determine and display multiple risk indicators for each time period and multiple cumulative risk indicators for multiple time periods. Graphing the risk indicators and the cumulative risk indicators may enable time periods during which the user account engaged in high risk activities to be easily identified, e.g., as illustrated in FIG. 2.

Figure 7:
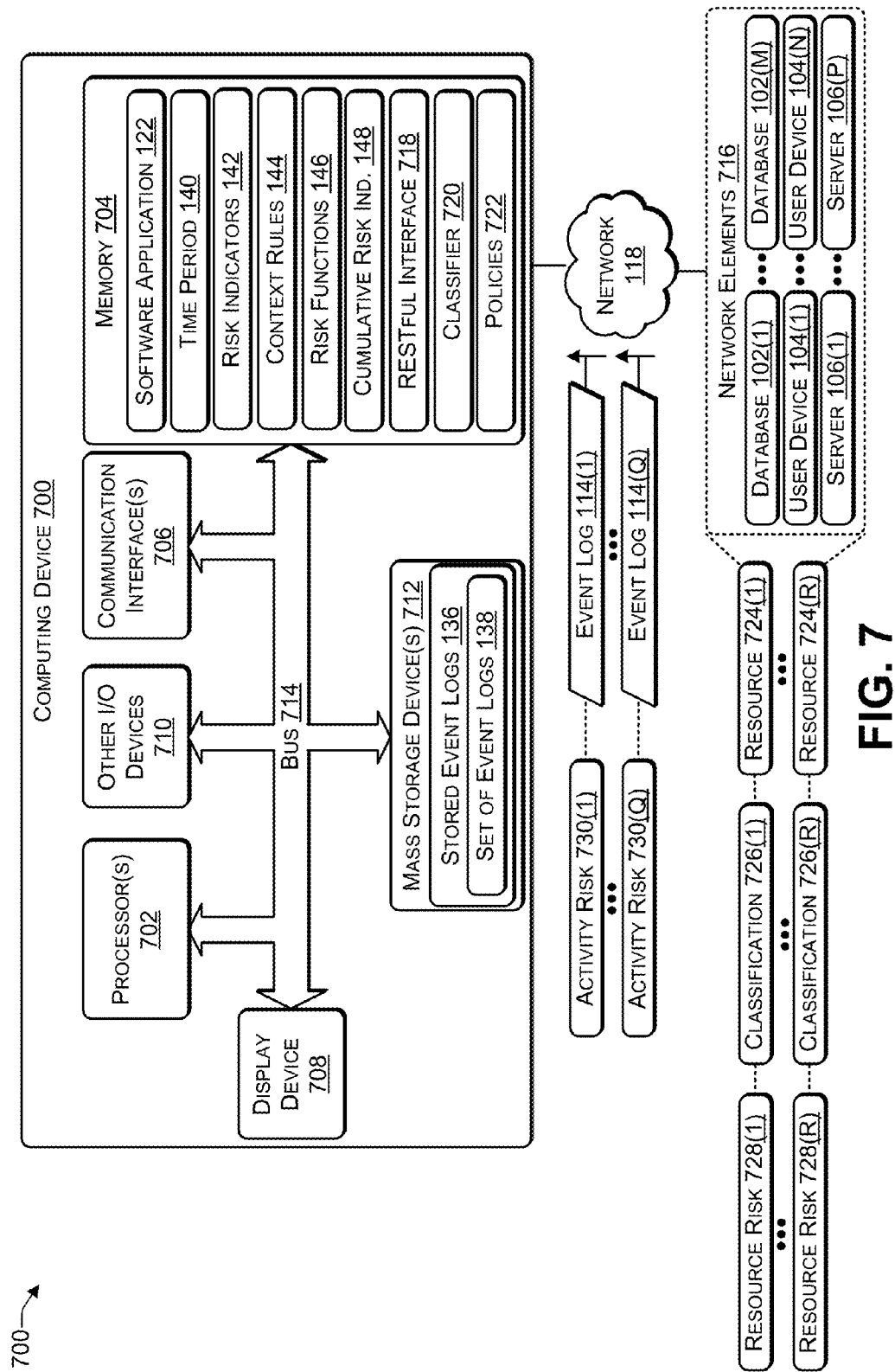
FIG. 7 illustrates an example configuration of a computing device that can be used to implement the systems and techniques described herein.

FIG. 7 illustrates an example configuration of a computing device that can be used to implement the systems and techniques described herein, such as to implement the central server 116 of FIG. 1. The computing device 700 may include at least one processor 702, a memory 704, communication interfaces 706, a display device 708, other input/output (I/O) devices 710, and one or more mass storage devices 712, configured to communicate with each other, such as via a system bus 714 or other suitable connection.

The processor 702 is a hardware device that may include a single processing unit or a number of processing units, all of which may include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media (e.g., memory storage devices) for storing instructions which are executed by the processor 702 to perform the various functions described above. For example, memory 704 may generally include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be a media capable of storing computer-readable, processor-executable program instructions as computer program code that can be executed by the processor 702 as a particular machine configured for carrying out the operations and functions described in the implementations herein.

The computing device 700 may also include one or more communication interfaces 706 for exchanging data via the network 118 with network elements 716. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 706 can also provide communication with external storage (not shown), such as in a storage array, network attached storage, storage area network, or the like. The network elements 716 may include the databases 102, the user devices 104, and the server devices 106. A display device 708, such as a monitor may be included in some implementations for displaying information and images to users. Other I/O devices 710 may be devices that receive various inputs from a user and provide various outputs to the user, and may include a keyboard, a remote controller, a mouse, a printer, audio input/output devices, and so forth.

The computer storage media, such as memory 704 and mass storage devices 712, may be used to store software and data. For example, the computer storage media may be used to store applications, such as the software application 122, and data, such as the stored event logs 136, at least one time period 140, one or more risk indicators 142, one or more context rules 144, and one or more risk indicators 148. The computer storage media may include a representational state transfer (RESTful) or similar interface 718, a classifier 720, and one or more policies 722. The RESTful interface 718 may be used for communications between an event log system (e.g., Dell® Change Auditor) and an identity manager system (e.g., Dell® Identity Manager). The analysis of event logs and the classifications associated with the resources being accessed (e.g., as indicated by the event logs) may be performed by the event log system, the identity manager system, or a combination of both. For example, the software application 122 may include an event log component and an identity manager component that interface with each other using the RESTful interface 718. The classifier 720 may be used to examine contents of resources, such as resources 724(1) to 724(R) (where R>0), and associate a classification with at least some of the resources 724. For example, if the resources 724 include unstructured data or semi-structured data, the classifier 720 may examine the contents of the resources 724 and associate a classification 728(1) with the resource 724(1) and associate a classification 728(R) with the resource 726(R). When determining the risk indicators 142, the software application may assign a resource risk to each of the resources 728. For example, a resource with a high level classification (e.g., restricted or classified) may be assigned a high resource risk while a resource with a low level classification (e.g., public or internal) may be assigned a low resource risk.

Each event log 114 may be assigned an activity risk based on the privileges associated with the user account, the resource identified in the event log 114, the location of the resource, the classification of the resource, the activity performed to the resource, the context associated with the event log 114, another factor, or any combination thereof. For example, the event log 114(1) may be assigned an activity risk 730(1) and the event log 114(Q) may be assigned an activity risk 730(Q).

Thus, a software application may identify a set of event logs generated as a result of a user account performing activities within a set of specified time periods. The software application may determine information associated with each event log in each time period, such as a type of activity that was performed (e.g., read, write, modify, etc.), a context of the activity, a resource that was accessed by the activity, a classification of the resource, a location of the resource, other information associated with each event log, or any combination thereof. The software application may determine a risk indicator associated with each event log in each time period based on the information, context rules, and risk functions. Based on determining a risk indicator for each event log in each set of event logs, the software application may determine and display multiple risk indicators for each time period and multiple cumulative risk indicators for multiple time periods. Graphing the risk indicators and the cumulative risk indicators may enable time periods during which the user account engaged in high risk activities to be easily identified, e.g., as illustrated in FIG. 2.

Figure 8:
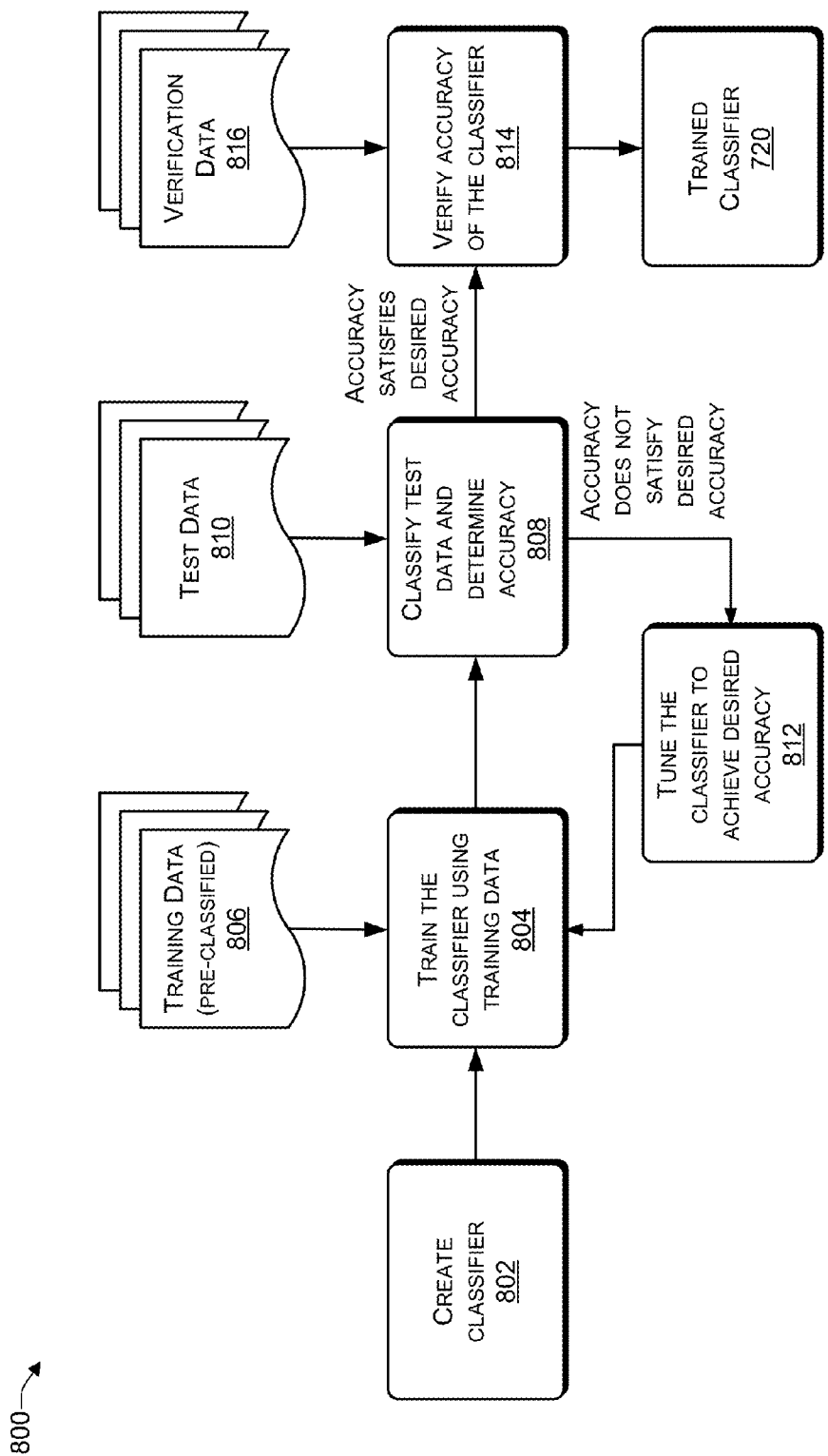
FIG. 8 shows an illustrative process to build and train a classifier according to some embodiments.

FIG. 8 shows an illustrative process 800 to build and train a classifier (e.g., the auditing software 122 of FIG. 1). At block 802, the classifier algorithm is created. For example, software instructions that implement one or more algorithms may be written to create the classifier. The algorithms may implement machine learning, pattern recognition, and other types of algorithms, using techniques such as a support vector machine, decision trees, ensembles (e.g., random forest), linear regression, naive Bayesian, neural networks, logistic regression, perceptron, or other machine learning algorithm.

At block 804, the classifier may be trained using training data 806. The training data 806 may include unstructured data (e.g., documents) that has been pre-classified using a taxonomy (e.g., public, internal, restricted, classified or the like) by a human, e.g., an expert.

At block 808, the classifier may be instructed to classify test data 810. The test data 810 (e.g., unstructured data, such as documents) may have been pre-classified (e.g., using a taxonomy) by a human, by another classifier, or a combination thereof. An accuracy with which the classifier 144 has classified the test data 810 may be determined. If the accuracy does not satisfy a desired accuracy, at 812 the classifier may be tuned to achieve a desired accuracy. The desired accuracy may be a predetermined threshold, such as ninety-percent, ninety-five percent, ninety-nine percent and the like. For example, if the classifier was eighty-percent accurate in classifying the test data and the desired accuracy is ninety-percent, then the classifier may be further tuned by modifying the algorithms based on the results of classifying the test data 810. Blocks 804 and 812 may be repeated (e.g., iteratively) until the accuracy of the classifier satisfies the desired accuracy.

When the accuracy of the classifier in classifying the test data 810 satisfies the desired accuracy, at 808, the process may proceed to 814 where the accuracy of the classifier may be verified using verification data 816 (e.g., unstructured data, such as documents). The verification data 816 may have been pre-classified (e.g., using a taxonomy) by a human, by another classifier, or a combination thereof. The verification process may be performed at 814 to determine whether the classifier exhibits any bias towards the training data 806 and/or the test data 810. The verification data 816 may be data that are different from both the test data 810 and the training data 806. After verifying, at 814, that the accuracy of the classifier satisfies the desired accuracy, the trained classifier 818 may be used to classify unstructured data, such as documents, using a taxonomy. For example, the classifier 818 may identify documents that include strings of numbers that are the same length and format as social security numbers, credit card numbers, account numbers associated with financial institutions (e.g., banks, credit card companies, etc.) and classify them as confidential documents. If the accuracy of the classifier does not satisfy the desired accuracy, at 814, then the classifier may be trained using additional training data, at 804. For example, if the classifier exhibits a bias to the training data 806 and/or the test data 810, the classifier may be training using additional training data to reduce the bias.

Thus, the classifier 720 may be trained using training data and tuned to satisfy a desired accuracy. After the desired accuracy of the classifier 720 has been verified, the classifier 720 may be used, for example, to classify documents according to a taxonomy based on the contents of each of the documents. For example, a document may include structured data or semi-structured data. The classifier 720 may examine the contents of the document and determine a classification based on the contents. For example, if the classifier 720 examines a document and finds a string of numbers that have the same length as a credit card number, a social security number, a bank account number, or the like, then the classifier 720 may associate a confidential classification with the document.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, software code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computer-implemented method, comprising:
generating a classifier based on a classifier algorithm;
training, using electronic training data, the classifier to classify data within a predetermined accuracy, wherein training the classifier to classify data within the predetermined accuracy comprises:
training the classifier with training data;
classifying, by the classifier, test data to generate classified test data;
determining that the test data is not within the predetermined accuracy based on a comparison of the classified test data with a pre-classified set of test data;
tuning the classifier;
retraining the classifier with the training data;
reclassifying, by the classifier, the test data to generate reclassified test data;
determining that the reclassified test data is within the predetermined accuracy based on a comparison of the reclassified test data with the pre-classified set of test data;
receiving, via a network, a first event log from an agent that is configured to monitor data activities at a data storage, the first event log including information pertaining to a first access to data stored in the data storage by an electronic device associated with a user account;
causing the first event log to be stored in an event log database;
retrieving, from the event log database, a set of event logs associated with a user account, each event log of the set of event logs occurring in a time interval;
selecting the first event log from the set of event logs, the first event log associated with a resource having a classification assigned to the resource by the classifier based at least in part on a taxonomy;
determining a first context associated with the first event log;
determining a first activity risk associated with the first event log based at least in part on the first context;
determining a first risk indicator associated with the user account based at least in part on the first activity risk;
receiving, via the network, a second event log from the agent during the time interval, the second event log including information pertaining to a second access to data stored in the data storage by the electronic device associated with the user account;
determining a second risk indicator associated with the user account based at least in part on the second event log; and determining a cumulative risk indicator for the time interval based on the first risk indicator and the second risk indicator.

2. The computer-implemented method of claim 1, further comprising:
selecting a third event log from the set of event logs;
determining a second context associated with the third event log;
determining a second activity risk associated with the third event log based at least in part on the second context; and
determining a third risk indicator associated with the user account based at least in part on the second activity risk.

3. The computer-implemented method of claim 2, further comprising:
displaying, for the time interval, a graph that includes a plurality of risk indicators including at least the first risk indicator the second risk indicator, and the third risk indicator.

4. The computer-implemented method of claim 2, further comprising:
determining a first cumulative risk indicator associated with the user account during a first time interval based at least in part on the first risk indicator and the second risk indicator;
determining a second cumulative risk indicator associated with the user account during a second time interval based at least in part on a second set of event logs; and
displaying a graph that includes a plurality of cumulative risk indicators including at least the first cumulative risk indicator and the second cumulative risk indicator.

5. The computer-implemented method of claim 1, further comprising:
determining the resource identified in the first event log as being accessed by an activity;
determining the classification associated with the resource; and
associating a resource risk associated with the resource based at least in part on the classification.

6. The computer-implemented method of claim 5, determining the first activity risk associated with the first event log based at least in part on the first context comprises:
determining the first activity risk based at least in part on the first context and the resource risk associated with the resource.

7. The computer-implemented method of claim 5, wherein:
the classification associated with the resource comprises one of public, internal, confidential, or restricted.

8. One or more non-transitory computer-readable media storing instructions that are executable by one or more processors to perform operations comprising:
generate a classifier based on a classifier algorithm;
train, using electronic training data, the classifier to classify data within a predetermined accuracy, wherein the operation to train the classifier to classify data within the predetermined accuracy further comprises:
train the classifier with training data;
classify, by the classifier, test data to generate classified test data;
determine that the test data is not within the predetermined accuracy based on a comparison of the classified test data with a pre-classified set of test data;
tune the classifier;
retrain the classifier with the training data;

reclassify, by the classifier, the test data to generate reclassified test data;
determine that the reclassified test data is within the predetermined accuracy based on a comparison of the reclassified test data with the pre-classified set of test data;
receive, via a network, a first event log from an agent that is configured to monitor data activities at a data storage, the first event log including information pertaining to a first access to data stored in the data storage by an electronic device associated with a user account;
cause the first event log to be stored in an event log database;
retrieve, from the event log database, a set of event logs associated with a user account, each event log of the set of event logs occurring in a time interval;
select the first event log from the set of event logs, the first event log associated with a resource having a classification assigned to the resource by the classifier based at least in part on a taxonomy;
determine a first context associated with the first event log;
determine a first activity risk associated with the first event log based at least in part on the first context;
determine a first risk indicator associated with the user account based at least in part on the first activity risk;
receive, via the network, a second event log from the agent during the time interval, the second event log including information pertaining to a second access to data stored in the data storage by the electronic device associated with the user account;
determine a second risk indicator associated with the user account based at least in part on the second event log; and
determine a cumulative risk indicator for the time interval based on the first risk indicator and the second risk indicator.

9. The one or more non-transitory computer-readable media of claim 8, the operations further comprising:
select a third event log from the set of event logs;
determine a second context associated with the third event log;
determine a second activity risk associated with the third event log based at least in part on the second context; and
determine a third risk indicator associated with the user account based at least in part on the second activity risk.

10. The one or more non-transitory computer-readable media of claim 9, the operations further comprising:
display, for the time interval, a graph that includes a plurality of risk indicators including at least the first risk indicator, the second risk indicator, and the third risk indicator.

11. The one or more non-transitory computer-readable media of claim 9, the operations further comprising:
determine a first cumulative risk indicator associated with the user account during a first time interval based at least in part on the first risk indicator and the second risk indicator;
determine a second cumulative risk indicator associated with the user account during a second time interval based at least in part on a second set of event logs; and
display a graph that includes a plurality of cumulative risk indicators including at least the first cumulative risk indicator and the second cumulative risk indicator.

12. The one or more non-transitory computer-readable media of claim 8, the operations further comprising:
determine the resource identified in the first event log as being accessed by an activity;
determine the classification associated with the resource; and
associate a resource risk associated with the resource based at least in part on the classification.

13. The one or more non-transitory computer-readable media of claim 8, determining the first activity risk associated with the first event log based at least in part on the first context comprises:
determine the first activity risk based at least in part on the first context and a resource risk associated with the resource, wherein the classification associated with the resource comprises one of public, internal, confidential, or restricted.

14. A server, comprising:
one or more processors; and
one or more non-transitory computer-readable media storing instructions that are executable by the one or more processors to perform operations comprising:
generate a classifier based on a classifier algorithm;
train, using electronic training data, the classifier to classify data within a predetermined accuracy, wherein the operation to train the classifier to classify data within the predetermined accuracy further comprises:
train the classifier with training data;
classify, by the classifier, test data to generate classified test data;
determine that the test data is not within the predetermined accuracy based on a comparison of the classified test data with a pre-classified set of test data;
tune the classifier;
retrain the classifier with the training data;
reclassify, by the classifier, the test data to generate reclassified test data;
determine that the reclassified test data is within the predetermined accuracy based on a comparison of the reclassified test data with the pre-classified set of test data;
receive, via a network, a first event log from an agent that is configured to monitor data activities at a data storage, the first event log including information pertaining to a first access to data stored in the data storage by an electronic device associated with a user account;
cause the first event log to be stored in an event log database;
retrieve, from the event log database, a set of event logs associated with a user account, each event log of the set of event logs occurring in a time interval;
select the first event log from the set of event logs, the first event log associated with a resource having a classification assigned to the resource by the classifier based at least in part on a taxonomy;
determine a first context associated with the first event log;
determine a first activity risk associated with the first event log based at least in part on the first context;
determine a first risk indicator associated with the user account based at least in part on the first activity risk;
receive, via the network, a second event log from the agent during the time interval, the second event log including information pertaining to a second access to data stored in the data storage by the electronic device associated with the user account;

determine a second risk indicator associated with the user account based at least in part on the second event log; and determine a cumulative risk indicator for the time interval based on the first risk indicator and the second risk indicator.

15. The server of claim 14, the operations further comprising:

select a third event log from the set of event logs;

determine a second context associated with the third event log;

determine a second activity risk associated with the third event log based at least in part on the second context; and determine a third risk indicator associated with the user account based at least in part on the second activity risk.

16. The server of claim 15, the operations further comprising:

display, for the time interval, a graph that includes a plurality of risk indicators including at least the first risk indicator, the second risk indicator, and the third risk indicator.

17. The server of claim 15, the operations further comprising:

determine a first cumulative risk indicator associated with the user account during a first time interval based at least in part on the first risk indicator and the second risk indicator;

determine a second cumulative risk indicator associated with the user account during a second time interval based at least in part on a second set of event logs; and display a graph that includes a plurality of cumulative risk indicators including at least the first cumulative risk indicator and the second cumulative risk indicator.

18. The server of claim 14, the operations further comprising:

determine the resource identified in the first event log as being accessed by an activity;

determine the classification associated with the resource; and associate a resource risk associated with the resource based at least in part on the classification.

19. The server of claim 18, wherein determining the first activity risk associated with the first event log based at least in part on the first context comprises:

determine the first activity risk based at least in part on the first context and the resource risk associated with the resource.

20. The server of claim 18, wherein:

the classification associated with the resource comprises one of public, internal, confidential, or restricted.

* * * * *